United States Patent [19]

Bialek

[11] Patent Number: 4,498,958
[45] Date of Patent: Feb. 12, 1985

[54] APPARATUS FOR TREATING TAR SANDS EMULSION

[75] Inventor: Rene F. Bialek, Calgary, Canada

[73] Assignee: Texaco Canada Resources Ltd., Calgary, Canada

[21] Appl. No.: 491,617

[22] Filed: May 4, 1983

[51] Int. Cl.³ .................. B01D 11/04; B01F 5/10; C10G 33/04; C10G 33/06
[52] U.S. Cl. .................................. 196/46; 252/360
[58] Field of Search .................. 196/14.52, 46, 46.1; 256/359 R, 360; 208/11 LE, 187, 188

[56] References Cited

U.S. PATENT DOCUMENTS

| | | | |
|---|---|---|---|
| 2,698,303 | 12/1954 | Blair et al. | 252/360 |
| 3,001,604 | 9/1961 | Worley | 252/360 |
| 3,014,879 | 12/1961 | Palmqvist | 252/360 |
| 3,453,205 | 7/1969 | Francis et al. | 196/46 |
| 3,595,777 | 7/1971 | Maher | 196/46 |
| 3,607,721 | 9/1971 | Nagy | 208/11 LE |

FOREIGN PATENT DOCUMENTS 0882550  11/1981  U.S.S.R. ................. 252/360

Primary Examiner—Bradley Garris
Attorney, Agent, or Firm—Robert A. Kulason; Robert B. Burns

[57] ABSTRACT

Method and apparatus for treating an oil-in-water, such as a bitumen-in-water emulsion, by premixing the emulsion for a sufficient period of time to permit it to become fully intermixed with emulsion breaking diluents and other additive materials. The modified, bitumen-containing emulsion stream is circulated through a premixer. At least a part of the emulsion stream is recirculated therein to intermix with fresh incoming emulsion flow. Thereafter the now more thoroughly intermixed emulsion, together with the various diluents and additives, is in better condition to be introduced to a separator unit for affecting a quiescent separation of water from the bitumen.

5 Claims, 1 Drawing Figure

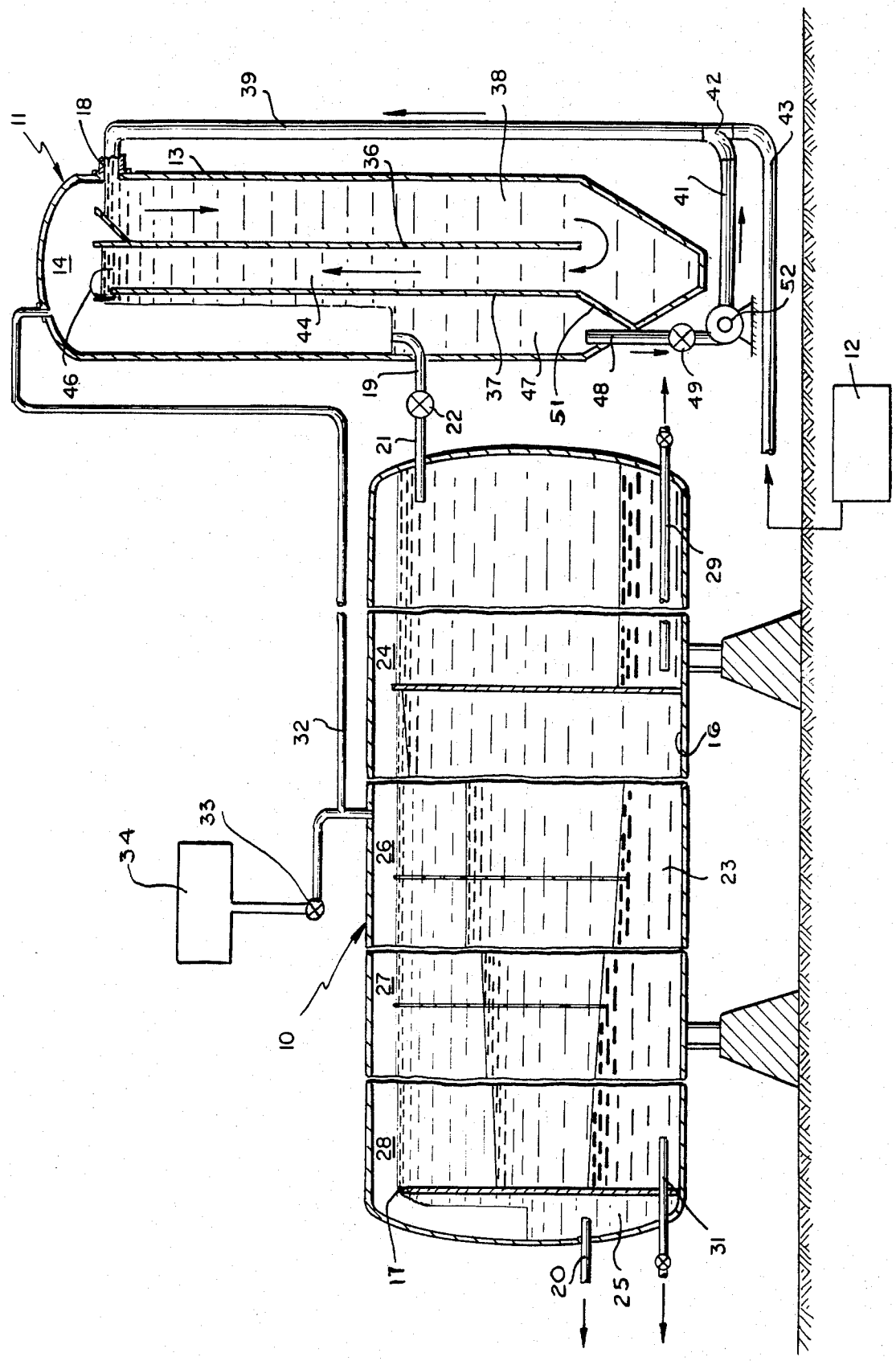

APPARATUS FOR TREATING TAR SANDS EMULSION

BACKGROUND OF THE INVENTION

The invention is addressed to the resolution of water-bituminous emulsions which are stabilized with clay by treatment with resins. The invention is further concerned with an apparatus for the separation of water from bitumen which has been produced, or brought to the earth's surface from a substrate, in the form of an oil-in-water emulsion by an in-situ recovery process.

The emulsion which usually results from a tar sand recovery process is normally very tight. It comes from the ground stabilized by clays and consists of complexes of oil and water. Physically, the bitumen droplets are believed to be surrounded by a layer of water, which in turn is surrounded by clays. The latter in turn can be surrounded by a film of bitumen which is enclosed in a thin film of water. This type of emulsion is found to be difficult to break through the use of standard chemicals whereby the bitumen might be freed.

The API gravity of the bitumen normally falls within the range of approximately 7 to 9, i.e., being heavier than water. However, to prompt the desired separation from water by flotation, the solution is treated with certain diluents which function to increase the bitumen's API gravity or, stated otherwise, to lessen its specific gravity.

Toward breaking the solution, it has been found that diluents or attempts to mix diluents with the bitumen emulsion, usually result in the diluent floating to the surface of the emulsion. Even when chemicals are added to, and mixed with the emulsion along with a diluent agent as is normally practiced, the diluent will still float to the top.

It is noted, however, that after a due time period of of almost two to three hours at standard temperature, if the entire aqueous solution is again subjected to a mixing action the emulsion will tend to break, the water segment moving downward and the bitumen then separating and rising to the top of the water layer.

In summary, it is believed that a complete and thorough mixing of the chemicals with the bitumen emulsion is important. Further the reaction time required for the chemicals to act should be somewhat extended. This fact necessitates an overly long treatment time, often mandates the use of cumbersome apparatus, or both.

Numerous hot water extraction methods exist for separating crude oil from bituminous sand (tar sands, oil sands and the like). These methods involve mixing the sands with hot or cold water and separating sand from the resulting emulsions.

Previous methods used to break bitumen emulsions resulting from hot water extraction processes are known in the art and have been used with a degree of success. Among such other ways are those by the techniques described in U.S. Pat. No. 3,607,721.

My issued patent U.S. Pat. No. 4,302,362, dated Nov. 24, 1981, discloses and claims a process for breaking an oil-in-water emulsion which is received or produced from a tar sand formation. The process includes the feature of contacting emulsion with a polyethylene polymeric resin having a molecular weight in the range of 100,000 and 7,000,000.

This emulsion, as disclosed, is permitted to stand for a period of time up to several hours, with or without the addition of diluent materials. Thereafter, the emulsion will break, permitting the separate removal of the diluent, and the oil mixture which floats at the surface of the water.

A primary object of the present invention therefore is to provide a novel method and apparatus for breaking a bitumen emulsion. A further object is to provide an apparatus which is capable of resolving a bitumen emulsion into discrete elements of water and bitumen through the expedient of pretreating the emulsion prior to its being separated. A still further object is to provide a premixing apparatus which initially receives a bitumen emulsion, and thereafter causes it to achieve a more thorough intermixing with additives and diluents over a sufficient period of time to facilitate the subsequent breaking of the emulsion and separation of the bitumen content.

Toward achieving these objectives, the presently disclosed apparatus provides, in brief, a separator which embodies an enlarged chamber into which pretreated emulsion is fed. The emulsion is initially subjected to a knockout operation wherein a major part of the water is disposed of.

In the succeeding steps, the emulsion is subjected to a coalescing action. Here, the emulsion is caused to pass through a plurality of small openings or ports characterized by relatively sharp peripheral edges which scarify the individual emulsion particles by a shear action. This physically removes or peels off layers of clay and/or water, and thus frees the innermost bitumen core.

Raw emulsion, normally in heated condition, is provided from a supply which in turn is produced from a subterranean tar sand source. The emulsion pretreating apparatus comprises primarily a chamber into which basic emulsion is pumped after it has been initially intermixed with a predetermined amount of diluent and various chemicals. The latter, as noted, function to expedite the breaking process.

The emulsion can be produced from its tar sand in-situ substrate by any one of a number of known stimulating processes. It is thereafter circulated through an elongated, discontinuous flow path by way of a plurality of passages. The discharge end of the discontinuous flow path is communicated with the emulsion separator inlet to deliver the stream of premixed and circulated emulsion thereto.

The emulsion premixer includes a recirculating pump having its suction communicated with a source to receive a portion of the entire emulsion flow at a point toward the downstream end of the discontinuous flow path. The recirculating pump receives at least a part of the emulsion flow and causes it to intermix with the main emulsion stream entering the flow path.

DESCRIPTION OF THE DRAWING

The drawing represents an elevation view in cross-section of the apparatus for carrying out the method.

Referring to the drawing, the combination of an emulsion separator 10 and an emulsion premixer 11 is shown. The latter is communicated at its inlet end to a source 12 of hot bitumen emulsion. The emulsion supply is usually produced in-situ from a tar sand layer or similar producing substrate.

Initially, hot emulsion at source 12 is modified by the addition of the necessary amount of diluents and/or chemicals to increase the bitumen's API gravity. The amount of the latter which is added will achieve a desired and rapid breaking of the emulsion into aqueous and bitumen segments.

Separator 10 embodies basically an elongated pressure vessel 16 having a fluid tight chamber 23 therein which is capable of being pressurized to establish a sustained median pressure of about 50 psi therein.

Separator chamber 23 is segregated into a series of sequentially aligned upright compartments 24, 26, 27 and 28. The first or upstream of said compartments 24, functions as a free water knockout facility. Said compartment initially receives premixed, modified bitumen emulsion to separate, primarily by gravity, a major part of the water content therefrom. The latter is removed from chamber 24 by drain outlet 29.

From knockout chamber 24, the now more concentrated emulsion passes through the serially connected coalescing chambers 26, 27 and 28. In the latter, the emulsion is caused to progressively separate into aqueous, and bitumen-containing segments, the latter floating to the surface.

Each coalescing compartment is provided with an overflow wier. In the instance of compartment 28, weir 17 provides the downstream edge thereof. Thus, separated bitumen which overflows the weir edge will accumulate in sump 25 prior to being removed by way of discharge conduit 20.

The downstream end of separator 10 is provided with a second water discharge conduit 31 as well as with the bitumen removal conduit 20.

Separator 10 is communicated by way of manifold 32 with a source of an inert pressurizing gas 34 such as nitrogen or the like. The latter is regulated by valve 33 to maintain the desired sustained pressure within internal chamber 23 to best effectuate emulsion breakdown.

Premixer 11 includes an elongated, upright vessel 13 which defines an internal chamber 14. A plurality of elongated panels 36 and 37 extending longitudinally through internal chamber 14, define interconnected parallel passages which in turn form a discontinuous vertical flow path along which the bitumen emulsion moves.

Inlet 18 and outlet means 19 are communicated respectively to opposed ends of said discontinuous flow path.

Normally, premixed bitumen emulsion is introduced to separator 10 by an inlet conduit 21 which includes a flow valve 22. The latter is adjustable to regulate the volume of hot, premixed bitumen emulsion which enters separator 10 and which can be efficiently broken.

The first of said premixer elongated panels 36, defines a primary vertical chamber 38, the upper end of which is communicated with elongated riser 39 at inlet 18. Riser 39 communicates in turn with pump discharge port 41 and with "Y" connection 42.

"Y" connection 42 is communicated with the source of bitumen emulsion 12 by way of connector 43 to receive an emulsion flow after the latter has been initially provided with a predetermined amount of the additive and chemical materials to facilitate the emulsion breaking process.

Primary vertical chamber 38 terminates at the lower end of chamber 14, and is communicated thereat with intermediate chamber 44. Thus, downwardly flowing emulsion from chamber 38 will rise through chamber 44 to an overflow weir 46 at the upper end thereof.

Second upright panel 37 within chamber 14 defines a third compartment 47 which receives an overflow of emulsion from intermediate chamber 44. Compartment 47 is provided, as noted, with a discharge outlet 19 which communicates through valve 22, with connector conduit 21 to separator 10.

The lower end of said third compartment 47 is closed at panel 51 to segregate said compartment from adjacent flow chambers within the vessel 11 lower end.

The lower end of third chamber 47 is further provided with a discharge pipe 48 which is communicated to the suction side of recirculating pump 52. Valve means 49 interposed in said discharge conduit 48 permits a controlled flow of mixed bitumen emulsion which passes from the chamber 47, to be metered in an amount as required to best effectuate the overall emulsion mixing action.

Operationally, circulating pump 52 receives from pipe 48 a minor portion of the entire emulsion flow which passes through the discontinuous bitumen flow passages 38 and 44. The minor flow is thereby recirculated and intermixed within vertical riser 39 to the incoming stream of modified bitumen emulsion from source 12.

Under normal conditions, the disclosed apparatus functions to enhance the emulsion treatment process from a consideration of both time and efficiency. By subjecting the emulsion to a period of static premixing and recycling within mixer unit 11, the subsequent residence time of the emulsion within separator 10 is greatly reduced.

In one example of the disclosed process, a source of bitumen emulsion is received from a subterranean site at which it is produced through injection of a hot stimulant such as steam into the substrate. To facilitate the breaking of the resulting produced emulsion, the latter is provided a diluent agent, together with amounts of one or more chemical elements which are known to facilitate the emulsion breaking steps.

One emulsion treating operation applicable to the instant situation, and as noted herein, is disclosed in my U.S. Pat. No. 4,302,326 entitled "Tar Sands Emulsion Breaking Process".

In said disclosure, the bitumen emulsion is mixed with a diluent material as well as with an amount of an ethylene oxide polymer such as "polyox", having a molecular weight within the range of 100,000 to 7,000,000. The resulting modified bitumen emulsion is then in a condition to be coalesced and consequently separated within separator unit 10.

However, in accordance with the instant invention, a composite emulsion is formed comprising a major percentage by volume of the unmixed modified emulsion from source 12, together with a minor amount of an integrated emulsion from chamber 47. The latter is metered by valve 49 at the downstream side of passage 47 to pump 52.

The composite bitumen emulsion is circulated through the discontinuous mixing passages or chambers 38 and 44 within mixer 11. A substantially integrated bitumen emulsion is thereafter conducted from chamber 47, through outlet 19 by way of valve 22 and conduit 21 to the separator 10.

As shown, the integrated bitumen emulsion flow received in chamber 47 enters the suction side of pump 52 by way of discharge pipe 48. The amount of integrated emulsion which is removed from the main emulsion flow in this manner can be varied by adjusting valve 49. Such adjustment is made in accordance with the volume of modified emulsion which is received from source 12, whereby to assure a steady flow of emulsion through separator 10.

Preferred operating conditions at the separating facility 10 are maintained by a blanketing gas from source 34 which is conducted by manifold 32 to stabilize the atmosphere of mixer 11 and separator 10. Thus, both said units will be maintained at a pressure of about 50 psi. The temperature of the emulsion during the process is preferably maintained substantially constant, within the range of about 150° F. to 300° F.

The present apparatus and its method of use, assures an efficient, relatively abbreviated period during which a bitumen emulsion can be resolved. Thus, by recirculating diluent modified emulsion through pump 52 and premixer 11, the emulsion is subjected to an extended residence time through a discontinuous passage, during which time the diluent agent can be most effectively integrated into the emulsion.

Further, the emulsion circulation rate can be increased without adversely affecting the quiescent settling function achieved in separator 10. Notably, the rate of emulsion circulation in premixer 11 will increase the output of both bitumen and water from the separator by an amount greater than has heretofore been achieved using the same proportions and amounts of diluent agents without the premixing thereof.

Although modifications and variations of the invention can be made without departing from the spirit and scope thereof, only such limitations should be imposed as are indicated in the appended claims.

I claim:

1. The combination of an aqueous emulsion separator having a pressurized emulsion separating compartment which is adapted to receive a flow of an aqueous bitumen emulsion comprising primarily water, bitumen and discrete additive materials, whereby to separate the bitumen from said aqueous emulsion, a mixer element having a compartment for premixing said bitumen emulsion with said discrete additive materials to facilitate separation of bitumen from the emulsion and comprising;

a vessel, panel means forming interconnected elongated passages in said vessel to define a disontinuous emulsion flow path, having inlet means at one end and outlet means at the other end, said outlet means being connected to said separator, pump means having a discharge port which is communicated with said discontinuous flow path and with a source of the aqueous bitumen emulsion, respectively, and said pump means having a suction port communicated with the discontinuous flow path at a point intermediate the respective inlet and outlet means to receive a minor stream of the aqueous emulsion and to recirculate the same along said discontinuous flow path.

2. In the apparatus as defined in claim 1, wherein said vessel is communicated with a source of a pressurized gas to maintain a unified pressure on surfaces of aqueous emulsion therein.

3. In the apparatus as defined in claim 1, including; flow control means communicated with said pump means suction port and being adjustable to regulate the flow of aqueous emulsion which enters the pump means.

4. In the apparatus as defined in claim 1 including conduit means communicating said outlet means with said pressurized emulsion separating compartment in said emulsion separator, said conduit means being connected to a source of a pressurized gas.

5. In the apparatus as defined in claim 4 including valve means in said conduit means being operable to regulate the pressure in the elongated passages and said emulsion separating compartment.

* * * * *